United States Patent Office 3,501,884
Patented Mar. 24, 1970

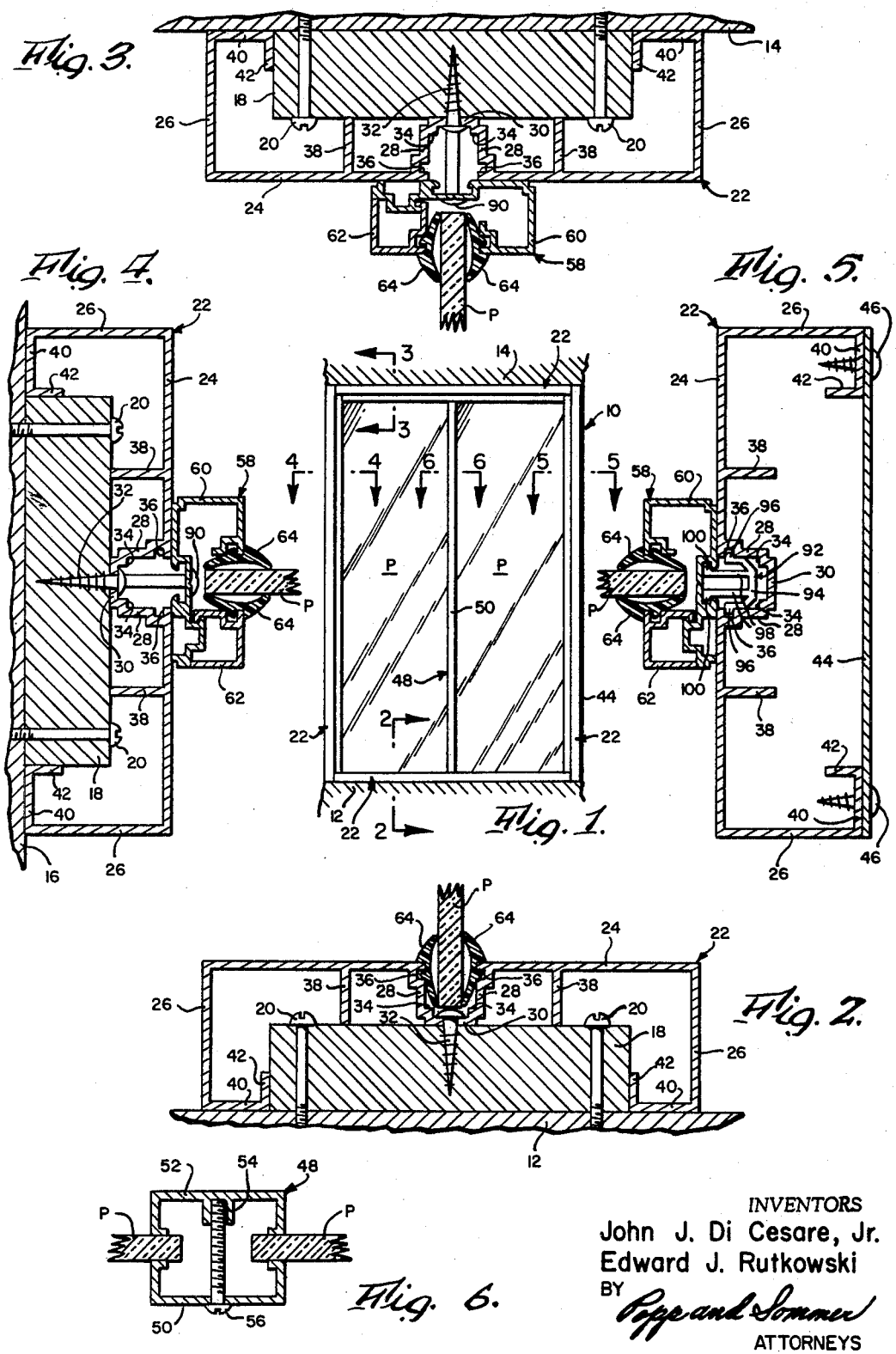

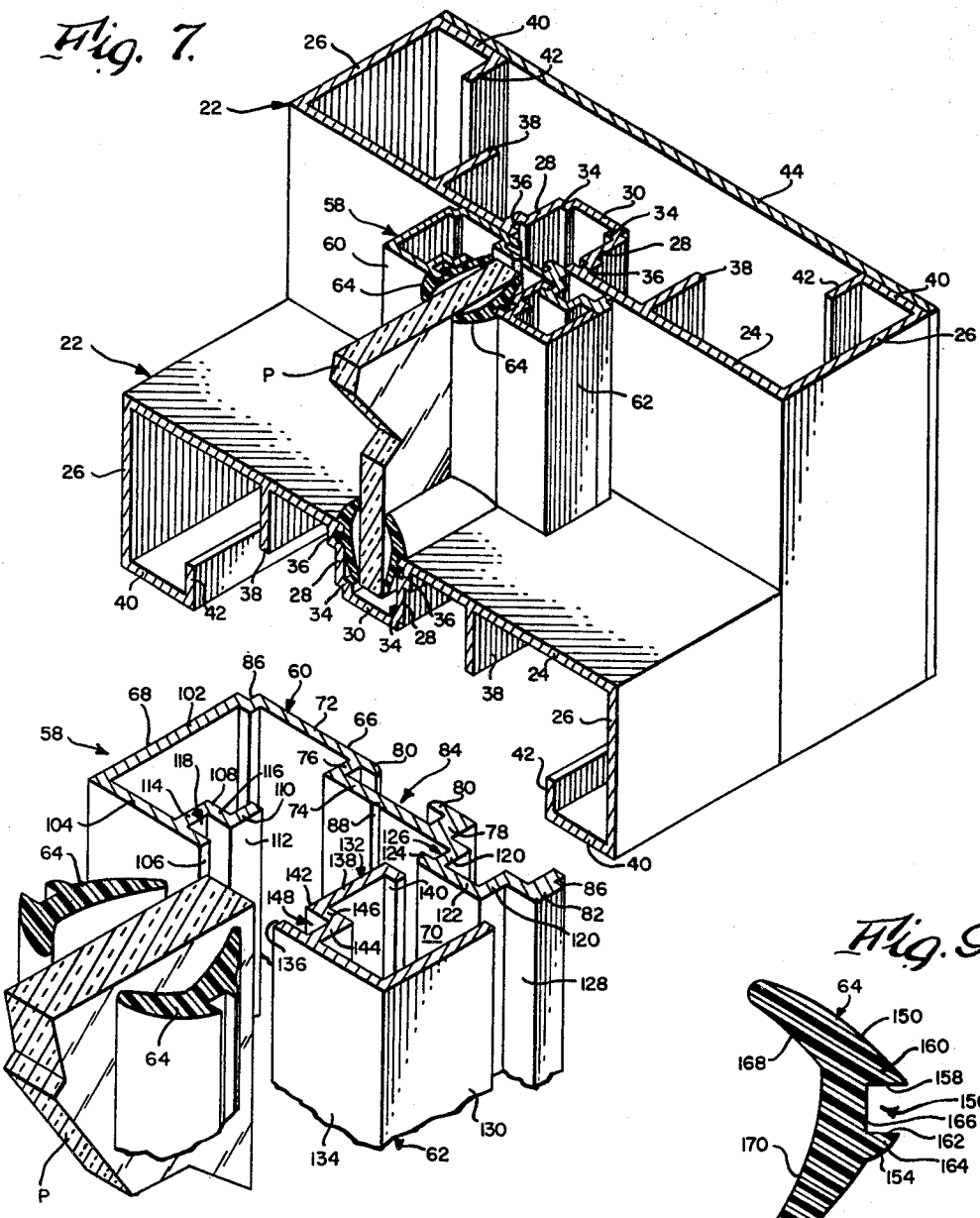

3,501,884
WALL CONSTRUCTION GLAZING SYSTEM
John J. Di Cesare, Jr., and Edward J. Rutkowski, Kenmore, N.Y., assignors to National Gypsum Company, Buffalo, N.Y., a corporation of Delaware
Filed Oct. 16, 1967, Ser. No. 675,614
Int. Cl. E04b 2/88; E06b 3/63, 1/18
U.S. Cl. 52—397                               4 Claims

ABSTRACT OF THE DISCLOSURE

In assembling a glass wall panel and a glazing strip, stop and bead assembly, an elongated metal glazing strip, composed of a base portion connecting transversely spaced large and small salient portions extending laterally outwardly from one side thereof, is installed by attaching the other side of the base portion to a support. The large L-shaped salient portion includes a transverse flange and a Z-shaped reentrant flange forming a pair of lateral coplanar surfaces separated by a recess and facing toward the small, U-shaped salient portion, which has an outstanding lug forming a groove opening toward the large salient portion. Next, a glass panel is installed by arranging its opposite marginal sides between the large and small salient portions, with the pair of lateral surfaces facing one marginal side for supporting the same. Next, an elongated, channel-shaped, metal glazing stop composed of a transverse leg and a pair of outstanding lateral legs, one of which is Z-shaped, terminates in an internal transverse tongue and forms with the transverse leg a pair of second lateral coplanar surfaces facing oppositely to the tongue and separated by a recess, is temporarily installed by arranging the lateral legs over the small salient portion and moving the stop transversely of the base portion to arrange the tongue in the groove with the pair of second lateral surfaces alined with the pair of first lateral surfaces and facing the other marginal side of the panel for supporting the latter. Finally, two flexible and resilient, crescent-shaped, plastic beads, each having a convex outer periphery provided with smaller and larger lips, are installed by wedging each bead in place between each marginal side of the panel and each pair of lateral surfaces to resiliently bias the tongue into the groove and secure the stop on the strip, such wedging causing each smaller lip to be snapped into each receses to secure each bead in place and each larger lip to overlie each outer side of the transverse flange and leg respectively, to limit the depth of insertion of each bead.

BACKGROUND OF THE INVENTION

Field of the invention

This invention relates to improvements in wall construction, and more particularly to a new and improved wall construction glazing system including a new and improved glazing strip, stop and bead assembly for supporting a wall panel, such as a glass panel, preferably in a demountable partition wall formed of extruded metal framing members, and a new and improved method of assembling such wall panel and assembly.

Description of prior art

In the art of installing glass panels in demountable partition walls, such as exemplified by U.S. Patent 3,323,-270, it is known to employ a fixed glazing strip, a removable glazing stop and a bead arranged between the glass panel and the strip and stop to protect the marginal edges of the panel. Initially, a framework of extruded metal members, such as cornice and rail caps, is erected, followed by installation of the glazing strips around the inside of such framework to provide a fixed moulding having an inside lateral surface for supporting one marginal side of one or more glass panels. After a protective channel-shaped bead is fitted over the marginal sides and edges of the glass panels, it is installed against the fixed moulding, and is held in place by securing the glazing stops on the glazing strips, either by fasteners, such as screws, or by a snap-fit over a salient on the strip, with the inside lateral surface of the stop supporting the other side of the beaded panel.

While this and other types of prior art glazing systems provide satisfactory support for glass panels, they do not accommodate themselves to supporting panels of varying thickness. Not only is the bead specifically designed for a panel of a given single thickness, but also the location of the stop on the strip is fixed, based on such single thickness. Moreover, assembly and disassembly of such conventional strips and stops are encumbered by requiring the use of either separate fasteners for securing the stop on the strips or a special tool to remove those stops which are necessarily deformed in being snapped on to the strips.

SUMMARY OF THE INVENTION

Accordingly, it is an object of the present invention to provide a new and improved wall construction glazing system designed to overcome the aforesaid and various other disadvantages of prior art systems. To this end the inventive system includes a new and improved glazing strip, stop and bead assembly and a new and improved method of assembling a wall panel, such as a glass panel, and such assembly, both of which assembly and method readily accommodate themselves to supporting panels of varying thickness and facilitate assembly and disassembly by completely eliminating any deformation of the stops or strips, as well as any separate fasteners or tools.

Another object of the invention is to provide a new and improved glazing strip which includes a pair of lateral panel supporting surfaces separated by a recess for receiving and positively securing a glazing head to support one marginal side of a wall panel, a transverse groove for receiving and positively securing a glazing stop to support the other marginal side of such panel, and a slot for receiving and positively securing a fastener for attaching the strip to a support.

Another object is to provide a new and improved glazing stop which is adapted to be moved transversely of the strip to facilitate assembly with and disassembly from the strip, which includes a pair of lateral surfaces separated by a recess for receiving and positively securing a glazing bead to support the other side of the panel, and a tongue adapted to be biased into the groove in the glazing strip to secure the stop on the strip, and which is adapted to be snapped into a channel in a cornice and rail cap for finishing a wall when no wall panel is installed in such channel.

Another object is to provide a new and improved glazing bead which has a generally crescent-shape and a width to length ratio permitting it to accommodate itself to supporting wall panels of varying thickness when being wedged between one or both marginal sides of the panel and the adjacent panel supporting surface means of the glazing strip and/or stop, and which includes a generally convex outer periphery having a smaller lip adapted to be snapped into the recess in the glazing strip and/or stop to positively secure the bead in place and a larger lip adapted to overlie a transverse outer surface on the glazing strip and/or stop to limit the depth of insertion of such bead.

Another object is to provide a new and improved glazing strip, stop and bead assembly wherein the bead resiliently biases the tongue on the stop into the groove in the strip and is essential to secure the stop on the strip.

Another object is to provide a new and improved method of assembling a wall panel and the glazing strip, stop and bead assembly wherein the installation of the bead not only completes the assembly by causing the stop to be secured on the strip, but also accommodates the assembly to supporting panels of varying thickness, while simultaneously securing the bead in place and limiting the depth of insertion of the bead.

Additional objects and advantages of the invention will become apparent upon consideration of the following detailed description and accompanying drawings, wherein:

BRIEF DESCRIPTION OF THE DRAWINGS

FIG. 1 is a front plan view of a ceiling height demountable wall section having a floor to ceiling window opening in which are removably mounted a pair of glass panels;

FIG. 2 is an enlarged section taken along line 2—2 of FIG. 1 and illustrating a floor cornice and rail cap as a preferred means for supporting the lower edges of the glass panels and employing a preferred embodiment of the glazing beads;

FIG. 3 is an enlarged section taken along line 3—3 of FIG. 1 and illustrating a ceiling cornice and rail cap on which is mounted a glazing strip, stop and bead assembly constituting a preferred embodiment of the invention for supporting the upper edges of the glass panels;

FIG. 4 is an enlarged section taken along line 4—4 of FIG. 1 and illustrating a left hand cornice and rail cap on which is mounted by means of screws a preferred embodiment of the inventive assembly for supporting the left hand edge of the left glass panel;

FIG. 5 is an enlarged section taken along line 5—5 of FIG. 1 and illustrating a right hand cornice and rail cap having its exposed right hand side closed by a cover plate, and having a preferred embodiment of the inventive assembly mounted on its left side by means of clips for supporting the right hand edge of the right hand glass panel;

FIG. 6 is an enlarged section taken on line 6—6 of FIG. 1 and illustrating a two part glazing divider bar assembly for supporting the opposing edges of the glass panels;

FIG. 7 is an enlarged and fragmentary perspective view of the lower right-hand corner portion of the wall section of FIG. 1, with certain parts removed for clarity, and illustrating in greater detail the manner in which the lower right hand corner of the right hand glass panel is supported by the floor cornice and rail cap employing the inventive glazing beads and by a preferred embodiment of the inventive assembly mounted on the right hand wall cornice and rail cap;

FIG. 8 is a further enlarged and fragmentary, exploded perspective view illustrating in greater detail the structure of the glazing strip, the glazing stop and the glazing beads making up a preferred embodiment of the inventive assembly, together with an edge portion of a glass panel to be supported thereby, and FIG. 9 is a further enlarged cross sectional view of a glazing bead constituting a preferred embodiment of the present invention.

DETAILED DESCRIPTION

Referring to the drawings, wherein like numerals indicate like parts, unless otherwise specified, and particularly to FIG. 1, a demountable partition wall section is generally indicated at 10. This wall section, which is of ceiling height, fills the space between the floor 12, ceiling 14 and left end wall 16 (FIG. 4) of a building, the right end of the wall section forming part of an internal opening in the building such as a passageway, walk through or the like. Wall section 10 also has a floor to ceiling window opening in which are removably mounted a pair of preferably glass wall panels P.

Each of the floor 12, ceiling 14 and end wall 16 is provided with an elongated wooden furring strip 18 which is suitably secured in place by means of screws 20, as seen in each of FIGS. 2, 3 and 4. Secured over these strips 18 are the floor, ceiling and left end wall cornice and rail caps 22, which are identical in construction except that left end cap 22 is longer. The right end cap 22 of FIG. 5 is of the same construction and is the same length as the left end cap 22 but is not secured to a separate furring strip 18 as are the other caps, rather preferably to the right ends of floor and ceiling strips 18, as will be explained below.

As shown in any of FIGS. 2–5, caps 22 are of generally channel-shaped uniform cross-section throughout their lengths and open to the outer sides of the rectangular frame formed thereby, as illustrated in FIG. 1. Each cap 22 includes a flat and wide base 24 connecting two perpendicular side flanges 26 extending outwardly from the inner side of the base which also includes the shorter perpendicular side walls 28 and bottom wall 30 of a narrow central channel recessed below and opening in the outer side of base 24. As shown in FIGS. 2–4, bottom walls 30 abuttingly engage the exposed sides of strips 18, are removably secured thereto by suitable fasteners such as screws 32 and are provided with raised shoulders 34 along their junctures with side walls 28 for recessing the heads of the screws. While the lower edges of panels P may rest upon the screw heads as shown in FIG. 2, one or more suitable resilient cushions, not shown, may be placed between raised shoulders 34 to avoid any concentration of stress at these points.

Each of channel side walls 28 is provided adjacent its outer end with a recess 36 opposing and alined with the other recess 36. The purpose of this structure is to permit the insertion of the inventive glazing beads or insert strips into each recess on opposite sides of panels P, as shown in FIG. 2, or to receive the opposite longitudinal edges of a flexible plastic insert strip (not shown) for closing off the channel where no glass panels are employed, or to receive a clip for securing the inventive glazing strip in place, as shown in FIG. 5.

Continuing with FIGS. 2–5, cap base 24 also includes a pair of internal perpendicular flanges 38 extending outwardly from the inner side of the base, spaced equally on opposite sides of the channel side walls and coextensive therewith. Like bottom walls 30, flanges 38 abuttingly engage the exposed sides of strips 18 as shown in FIGS. 2–4, and thus provide a firm, steady support for each base 24.

Considering side flanges 26, each is provided with a perpendicular end flange 40 opposing and coplanar with the other end flange 40, and each terminating in a perpendicular and inwardly turned reentrant flange 42 spaced from and parallel to the other reentrant flange. As will be apparent, end flanges 40 abuttingly engage floor 12, ceiling 14 and left end wall 16 respectively, while reentrant flanges 42 abuttingly engage the longitudinal edges of strips 18, all to provide a firm, stable support for side flanges 26 and to ensure a snug fit over these strips.

As far as the right end cap 22 of FIG. 5 is concerned, this preferably is secured in place by passing suitable fasteners such as screws (not shown) reversely through bottom wall 30 of the channel into the ends (not shown) of floor and ceiling strips 18. Moreover, the open right side of right end cap 22 is closed by a cover plate 44 preferably secured thereto by suitable fasteners such as screws 46 passing through end flanges 40.

Other examples of employing the aforesaid cap in various horizontal and vertical positions for various purposes in wall construction readily may be found in U.S. Patents 3,323,262 and 3,323,270, and in the copending application of Jack A. Dawdy et al., Ser. No. 420,995, filed Dec. 24, 1964, now U.S. Patent 3,358,410.

Referring briefly to FIG. 6, wall section 10 also includes a glazing divider bar assembly generally indicated at 48 for supporting the opposing edge portions of the pair of glass panels P, as also illustrated in FIGS. 1–5. This divider bar assembly is composed of a pair of generally channel-shaped members 50 and 52 each provided with inturned distal flange portions designed to abut and support the sides of panels P adjacent their opposing edges. Member 50 has a central opening through its base and member 52 has a central internal and internally threaded nut or boss portion 54 for receiving the threaded stem of bolt 56, which is turned in the usual manner, either to tighten members 50 and 52 into engagement with panels P, or to loosen and permit removal of such members.

As will be appreciated, the various structural wall framing members described above, such as caps 22, plate 44 and divider members 50, 52 preferably are formed as unitary members by extruding metal. From the standpoints of economy, lightweight, high strength and appearance, satin-anodized aluminum of suitable gauge has been found to be particularly adapted for use in practicing the present invention, not only in extruding the aforesaid members, but also in extruding the preferably unitary glazing strip and stop components of the inventive assembly, as well as the clips for connecting the glazing strip to cap 22 (FIG. 5).

Referring to FIGS. 3–5, the glazing strip, stop and bead assemblies, each constituting a preferred embodiment of the invention, are generally indicated at 58, and each assembly includes a glazing strip 60, a glazing stop 62 and preferably a pair of glazing beads 64. Inasmuch as the structure of ceiling assembly 58 of FIG. 3 is identical to that of the end wall assemblies of FIGS. 4 and 5, except for length, a detailed description of one will suffice for all.

As best seen in FIGS. 7 and 8, and particularly in FIG. 8, the elongated unitary glazing strip 60 includes a transversely elongated base portion 66, a large salient portion 68 and a small salient portion 70. Base portion 66 includes a thin transverse flat flange 72 extending from the far longitudinal edge to a thick transverse flat flange 74 extending to the near longitudinal edge of the base portion. The rear side of flange 74 is hollowed out adjacent flange 72 and between the large and small salient portions to form a generally T-shaped slot completed by lateral flanges 76, 78 and opposing transverse lugs 80 for a purpose to be described below. Likewise, the rear side of flange 74 is hollowed out beyond slot 84 to form small salient portion 70 and lateral flange 82, which, like the far end of flange 72, perferably is provided with a notch 86 to produce shadow lines when fitting glazing strip 60 against base portion 24 of cap 22 (FIG. 7) for improved appearance. Likewise, the raised front surface of flange 74 preferably is provided with a longitudinal starter groove 88 centered with respect to slot 84, to assist securing glazing strip 60 in place on cap 22 when employing suitable fasteners, such as screws 90, as shown in FIGS. 3 and 4.

Alternatively, glazing strip 60 may be removably secured to cap 22 by one or more clips 92, such as shown in FIG. 5. These clips, only one of which is shown, are of any suitable length and of generally T-shape cross-section and include a stepped umbrella-shaped cross-bar 94 having outstanding bosses 96 at its outer ends and a pair of spaced legs 98 having outstanding bosses 100 at their outer ends. Thus, when so securing glazing strip 60 to cap 22, each clip 92 is inserted into the channel of cap 22 until the bosses 96 on the ends of resilient cross bar 94 snap into place in the opposing recesses 36 of the channel. Following this, glazing strip 60 is forced over resilient legs 98 of the clip until bosses 100 snap into place in the T-shaped slot 84 behind lug portions 80.

Returning to FIGS. 7 and 8, and particularly FIG. 8, the large salient portion 68 is of generally L-shape cross section and is formed by a lateral flange 102 extending outwardly from flange 72 along one longitudinal edge of base portion 66, a transverse flange 104 extending from flange 102 toward small salient portion 70 and terminating in a free edge 106 forming one of a pair of coplanar lateral panel supporting surfaces, and a reentrant flange 108 of generally Z-shaped cross section extending inwardly from flange 104. Reentrant flange 108 includes an outer lateral flange portion 110 having an outer lateral side 112 forming the other lateral surface of the pair, an inner lateral flange portion 114 having a recessed lateral side extending from the inner side of flange 104 but inset from free edge 106 and transverse flange portion 116 having a transverse side extending from such recessed lateral side to outer lateral side 112, to form recess 118 which separates the two panel supporting surfaces 106, 112 and is adapted to receive and positively secure inventive bead 64 for supporting the far marginal side of panel P.

Continuing with FIG. 8, small salient portion 70 preferably is hollow and of generally U-shaped cross-section, being formed by a pair of relatively short and transversely spaced, lateral arms 120 extending outwardly from the front side of transverse flange 74 adjacent the near longitudinal edge of base portion 66. These arms 120 are connected by a transverse arm 122, the inner end of which projects beyond the inner one of arms 120 form a lug 124 which is spaced from and forms with inner arm 120 and the front side of flange 74 a transverse groove 126 facing toward, but spaced laterally inwardly from recess 118, for a purpose to be described below. It is also to be noted that outer or right arm 120 is inset from the near longitudinal edge of base portion 66 to provide a shoulder or surface 128 for the desired transverse movement of glazing stop 62.

This stop 62 is of generally channel-shaped cross section and includes a pair of outstanding lateral legs 130, 132 connected by a transverse leg 134. The outer or right leg 130 is of generally straight configuration and its outer edge is adapted to slide transversely on shoulder 128 between outer arm 120 and the near longitudinal edge of base portion 66, for the desired movement of stop 62. Transverse leg 134 terminates in a free edge 136 forming one of another pair of coplanar panel supporting surfaces, and inner lateral leg 132, which is of generally Z-shaped cross section, is adapted to move transversely of the front side of flange 74 between panel P and inner lateral arm 120, also for the desired movement of stop 62. This leg includes an outer lateral leg portion 138 terminating at its free end in an internal transverse tongue 140 and having an outer lateral side 142 forming the other lateral panel supporting surface, an inner lateral leg portion 144 having a recessed lateral side extending from the inner side of transverse leg 134 but inset from free edge 136 and a transverse leg 146 having a transverse side extending from such recessed lateral side to outer lateral side 142, to form recess 148 which separates the two panel supporting surfaces 136, 142 and is adapted to receive and positively secure another inventive bead 64 for supporting the near marginal side of panel P.

As best seen in FIGS. 7 and 8, tongue 140 on stop 62 is movable into and out of groove 126 in small salient portion 70 of glazing strip 60 to facilitate assembly and disassembly thereof and is engageable behind lug 124 to removably secure the stop on the strip, with outer lateral leg 130 being spaced a sufficient distance from tongue 140 to permit such assembly and disassembly without deformation of either the stop or the strip. Likewise, as is evident from FIGS. 3–5 and 7, when the stop and strip are assembled, opposing recesses 118 and 148 are alined, while the opposing or facing pairs of lateral surfaces 106, 112 and 136, 142 are parallel, and the outer surfaces of transverse flange 104 and transverse leg 134 are coplanar, for balanced support of panels P and improved appearance. Although not shown, it is also to be noted that stop 62 is adapted to be snapped into the channel of cap 22 in order to fill such channel in finishing a wall where no panels P are inserted into the channel.

Referring now to FIGS. 8 and 9, and particularly FIG. 9, each inventive glazing bead 64 is formed of flexible resilient material, such as a flexible polyvinyl chloride compound preferably having a durometer of about 75. Each bead has a generally crescent-shaped cross-section formed by a generally concave inner periphery and a generally convex outer periphery merging with the inner periphery at opposite rounded ends lying in a common plane and adapted to engage and resiliently support the adjacent side of panel P.

The outer periphery includes an upper outer arcuate surface 150 extending laterally outwardly and transversely downwardly or inwardly from the upper end of the bead to an outermost edge intermediate the ends of the bead, a lower outer arcuate surface 152 extending laterally outwardly and transversely upwardly or inwardly to an inner edge spaced transversely below and laterally inwardly from the outermost edge, and an intermediate outer arcuate surface 154 extending laterally outwardly and transversely upwardly from the inner edge to an intermediate edge spaced transversely below the outermost edge but above the inner edge, as well as laterally inwardly from the outermost edge. A slot 156 is cut out between the outer and intermediate edges forming the lower surface 158 of larger upper lip 160 and the upper surface 162 of a smaller lower lip 164. These surfaces 158 and 162 are arranged generally perpendicularly to the plane of the bead ends and are connected by an inner wall 166 of slot 156 arranged generally parallel to such plane.

The inner periphery of bead 64 is formed by an upper inner arcuate surface 168 extending laterally inwardly and transversely downwardly from the upper end of the bead, and a lower inner arcuate surface 170 extending laterally inwardly and transversely upwardly from the lower end of the bead and intersecting surface 168 in an innermost edge intermediate the ends of the bead.

Bead 64 is so proportioned that the ratio of the overall width, measured from the plane of the ends to the outermost edge, to the overall length, measured from end to end along such plane, is more than ½, and preferably about ⅗, in order to permit the bead to flex sufficiently to support panels of varying thickness typically 3/16 to 7/32 to ¼ inch. In order to provide the desired overall shape and wall thickness resulting in the desired flexibility, while maintaining the desired ratio of width to length, the radii of curvature and lengths of the various arcuate surfaces are proportioned as follows: listed in order of decreasing radii are surfaces 152, 150, 170, 168 and 154, and listed in order of decreasing length (measured along the chord of the arc) are surfaces 170, 150, 152, 168, and 154. To this same end, surfaces 168 and 170 diverge from surfaces 150 and 152 respectively, while the intersection of surfaces 168, 170 at the aforesaid innermost edge is located adjacent the level of the outermost edge forming the lower terminus of surface 150.

In erecting a wall section, such as 10, as indicated in FIG. 1, caps 22 are appropriately secured in place on furring strips 18 to form the rectangular frame, as noted previously. In accordance with the inventive method, glazing strips 60 are installed by attaching the rear sides of the base portions 66 to the appropriate caps 22 to complete the window opening. These glazing strips may be secured in place by suitable fasteners, such as screws 90, shown in FIGS. 3 and 4, or clips 92, as shown in FIG. 5, and the ends of one or more of these strips may be notched (not shown) in any suitable manner to provide for proper fitting in the upper corners and to facilitate installation of the stops. If more than one wall section is to be erected, it will be apparent that this may be done without regard to installation of panels P, which can wait until the end. Thus, when desired, the panels P readily may be installed by inserting their lower edges in the channel in floor cap 22 (FIG. 2), and by arranging their opposite marginal sides between the large and small salient portions on strips 60 (FIGS. 3–5, 7 and 8), with surfaces 106, 112 facing the far marginal sides of the panels for supporting the same.

Next, the stops 62 are temporarily installed on strips 60, to temporarily secure panels P in place, by arranging legs 130, 132 over and straddling small salient portions 70 and moving the stops transversely of base portions 66 to arrange tongues 140 in grooves 126, thereby hooking the tongues on lugs 124. As noted above in connection with strips 60, the ends of one or more of stops 62 are notched in any suitable manner (not shown) to ensure a proper fit in the upper corners.

Preferably, the ceiling stop 62 is installed first in wall section 10, as this will loosely support the upper marginal sides of both panels P, whereupon the installation of the left and right hand wall stops may be accomplished as desired. The area of engagement between internal tongue 140 on stop 62 and lug portion 124 on small salient portion 70 of each strip 60 is sufficient to hold each stop, including the ceiling stop, temporarily in place.

Next, or following installation of beads 64, the divider bar channel members 52, 50 of FIG. 6 are assembled on opposite sides of the opposing panel edge portions by tightening bolts 56.

The assembling of panels P and the glazing strip, stop and bead assembly of wall section 10 is completed by wedging beads 64 between both marginal sides of panels P and the adjacent panel supporting surfaces of glazing strips 60, glazing stops 62 and the channel of floor cap 22 in any desired order, but preferably first on one side of the panels and then on the other. It is but a simple matter to wedge each flexible resilient bead 64 into place, as shown in FIGS. 7 and 8 until the smaller lip 164 snaps into recess 118 in strip 60 or recess 148 in stop 62. The depth of insertion of bead 64 is controlled by the larger lip 160 which overlies and preferably bears against the outer surface of transverse flange 104 of strip 60 or the outer surface of transverse leg 134 of stop 62. When this action is completed, the smaller lips 164 are secured in place in the corresponding stops and strips and the beads are compressed laterally between the respective pairs of coplanar surfaces 106, 112 on the strips and 136, 142 on the stops, with the spread apart ends of the beads firmly but resiliently engaging and supporting the adjacent sides of panels P.

For example, as seen in any one of FIGS. 3–5 and 7, the slot 156 in bead 64 fits around and receives the free edge 106 of transverse flange 104 of strip 60 between the opposing lip surfaces, while a portion of outer surface 152 engages outer lateral side 112 of outer lateral leg 110 of large salient portion 68 below small lip 164, to ensure the desired engagement between the adjacent side of panel P and the ends of the inner periphery of bead 64, while preventing any possible outward pivoting movement of the bead around free edge 106. In addition, the arrangement of smaller lip 164, in recess 118 effectively prevents the bead from being accidently moved out of position, such as by vibration, or from falling out, as when installing an overhead bead. The same structural relationship is obtained between the bead and the corresponding structure of glazing stop 62. Likewise, the beads 64 are wedged in place in the same manner in the channel of floor cap 22, as shown in FIG. 2, with smaller lips 164 fitting in recesses 36, etc.

Returning to FIG. 7, the desired engagement between internal tongue 140 on each stop 62 and lug portion 124 on small salient portion 70 of each glazing strip 60 is maintained by the beads, which firmly but resiliently bias the tongues into grooves 126, in order to positively secure each stop on each strip. When so secured, the outer side of outer lateral leg 130 of the stop preferably is flush with the outer side of flange 82 of the strip as shown, for improved appearance.

Thus, the installation of panels P is greatly facilitated, simply by inserting the inventive glazing beads 64, not only to resiliently support and protect the panels, but also to securely lock each inventive glazing stop 62 on each inventive glazing strip 60, and thereby complete each inventive assembly, all without the use of separate fasteners for securing the strips and stops together. At the same time, flexibility in the assembly is maintained, in that the glazing beads are adapted to accommodate to panels P of varying thickness, while still producing the desired securement of the movable stops on the strips.

It now will be seen how the invention accomplishes its various objects and numerous advantages also will be apparent. While the invention has been described and illustrated herein by reference to certain preferred embodiments, it is to be understood that various changes and modifications may be made by those skilled in the art without departing from the inventive concept, the scope of which is to be determined by the appended claims. For example, the insertion of panels P into the channel of floor cap 22 (FIG. 2) could be eliminated by attaching the inventive glazing strip, stop and bead assemblies thereto. Likewise, if desired, the various components of the inventive assemblies could be so constructed as to employ beads 64 on either the near or the far side of each panel P instead of on both sides, as shown.

What is claimed is:

1. Wall construction including a wall panel, such as a glass panel, and a glazing strip, stop and bead assembly removably supporting said panel, wherein the improvement comprises: an elongated glazing strip comprising a base portion connecting transversely spaced large and small salient portions extending laterally outwardly from one side thereof, said large salient portion including first lateral surface means facing toward said small salient portion and said small salient portion being inset from one longitudinal edge of said base portion and including inner and outer lateral means extending outwardly from said one side of said base portion, with only said inner lateral means forming a transverse groove opening toward said large salient portion; said panel having its opposite marginal sides arranged between said large and small salient portions, with said first lateral surface means facing one marginal side of said panel for supporting the same; an elongated glazing stop of generally channel-shaped cross-section and comprising a transverse leg connecting a pair of outstanding inner and outer lateral legs arranged over and straddling said small salient portion, said inner lateral leg being movable transversely of said one side of said base portion between said panel and said inner lateral means of said small salient portion, and said outer lateral leg being so movable between said outer lateral means of said small salient portion and said one longitudinal edge of said base portion, with only said inner lateral leg having an internal transverse tongue movable into and out of said groove and also having second lateral surface means facing said first lateral surface means and the other marginal side of said panel for supporting the latter, and with said outer lateral leg being spaced a sufficient distance from said tongue to permit said stop to be assembled with and disassembled from said strip without deformation of said stop or strip; one of said first and second lateral surface means including a pair of lateral surfaces separated by a recess; one of said large salient portion and stop including a transverse member terminating in a free edge forming one of said lateral surfaces and having an outer side intersecting said one lateral surface, and a lateral member of generally Z-shaped cross-section including an outer lateral portion having an outer lateral side forming the other of said lateral surfaces substantially co-planar with said one lateral surface, an inner lateral portion having a recessed lateral side extending from the inner side of said transverse member but inset from said free edge thereof and a transverse portion having a transverse side extending from said recessed lateral side to said outer lateral side to form said recess; and elongated glazing bead means of flexible resilient material including a bead inserted and wedged in place between one marginal side of said panel and said pair of lateral surfaces following installation of said panel and stop to resiliently bias said tongue into said groove and being essential to secure said stop on said strip; said bead comprising, in generally crescent-shaped cross-section, a generally concave inner periphery and a generally convex outer periphery merging with said inner periphery at opposite ends lying in the same plane and supporting one marginal side of said panel, said outer periphery including a first outer surface extending laterally outwardly and transversely inwardly from one end to an outermost edge intermediate said ends, a second outer surface extending laterally outwardly and transversely inwardly from the other end to an inner edge spaced laterally inwardly and transversely from said outermost edge, a third outer surface extending laterally outwardly from said inner edge to an intermediate edge spaced laterally inwardly and transversely from said outermost edge, and a slot cut out between said outermost and intermediate edges to form the opposing surfaces of a smaller lip and a larger lip, said smaller lip having said third outer surface and being snapped into said recess to secure said bead in place, and said slot receiving said free edge of said transverse member between said opposing surfaces with said larger lip having said first outer surface and overlying said outer side of said transverse member adjacent said free edge to limit the depth of insertion of said bead.

2. The wall construction of claim 1 wherein said second lateral surface means includes said pair of lateral surfaces separated by said recess, said transverse leg of said stop is said transverse member, and terminates in said free edge forming said one lateral surface and has said outer lateral side intersecting said one lateral surface, said inner lateral leg of said stop is said lateral member of said generally Z-shaped cross-section and includes an outer lateral leg portion terminating at its free end in said tongue and having said outer lateral side forming said other lateral surface, an inner lateral leg portion having said recessed lateral side extending from said inner side of said transverse leg but inset from said free edge thereof and a transverse leg portion having said transverse side extending from said recessed lateral side to said outer lateral side to form said recess; and said bead is so inserted and wedged in place between said other marginal side of said panel and said pair of lateral surfaces.

3. The wall construction of claim 1 wherein said first lateral surface means includes satd pair of lateral surfaces separated by said recess, said large salient portion is of generally L-shaped cross-section and includes a lateral flange extending outwardly from said one side of said base portion adjacent the other longitudinal edge thereof, a transverse flange being said transverse member and extending from said lateral flange toward said small salient portion, terminating in said free edge forming said one lateral surface and having said outer side intersecting said one lateral surface, and a reentrant flange being said lateral member of said generally Z-shaped cross-section extending inwardly from said transverse flange, said reentrant flange including an outer lateral flange portion having said outer lateral side forming said other lateral surface, an inner lateral flange portion having said recessed lateral side extending from said inner side of said transverse flange but inset from said free edge thereof and a transverse flange portion having said transverse side extending from said recessed lateral side to said outer lateral side to form said recess; said small salient portion is of generally U-shaped cross-section and said inner and outer lateral means are respectively a pair of transversely spaced inner and outer lateral arms connected by a transverse arm having an outstanding lug extending beyond said inner lateral arm to form said groove with said inner lateral arm and said one side of said base portion; and said bead is so inserted and wedged in place between said one marginal side of said panel and said pair of lateral surfaces.

4. The wall construction of claim 3 wherein said second lateral surface means includes a pair of second lateral surfaces separated by a second recess, said transverse leg of said stop terminates in a second free edge forming one of said second lateral surfaces and has an outer side intersecting said one second lateral surface, said inner lateral leg of said stop is of generally Z-shaped cross section and includes an outer lateral leg portion terminating at its free end in said tongue and having a second outer lateral side forming the other of said second lateral surfaces substantially coplanar with said one second lateral surface, an inner lateral leg portion having a second recessed lateral side extending from the inner side of said transverse leg but inset from said second free edge thereof and a transverse leg portion having a second recessed lateral side extending from the inner side of said transverse leg but inset from said second free edge thereof and a transverse leg portion having a second transverse side extending from said second recessed lateral side to said second outer lateral side to form said second recess; and said bead means includes a second bead so inserted and wedged in place between said other marginal side of said panel and said pair of second lateral surfaces, said second bead having the same structure as said bead and the same relationship with said other marginal side of said panel and said stop as the relationship of said bead with said one marginal side of said panel and said large salient portion, and in each of said beads said outer surfaces are arcuate, said intermediate edge is spaced transversely between said inner and outermost edges, said opposing surfaces of said lips are generally perpendicular to said plane and connected by an inner wall of said slot generally parallel to said plane, and said inner periphery includes a first inner arcuate surface extending laterally inwardly and transversely inwardly from said one end, and a second inner arcuate surface extending laterally inwardly and transversely inwardly from said other end and intersecting said first inner surface at an innermost edge intermediate said ends.

References Cited

UNITED STATES PATENTS

| 3,334,463 | 8/1967 | Muessel | 52—501 |
| 3,016,993 | 1/1962 | Owen | 52—398 X |
| 3,081,849 | 3/1963 | Hubbard | 52—397 X |
| 3,090,085 | 5/1963 | Brown | 52—397 |
| 3,147,518 | 9/1964 | Horgan | 52—397 X |
| 3,267,629 | 8/1966 | Waring | 52—397 |
| 3,352,078 | 11/1967 | Neal | 52—397 X |

FOREIGN PATENTS

| 643,541 | 1962 | Canada. |
| 1,228,973 | 1959 | France. |

JOHN E. MURTAGH, Primary Examiner

U.S. Cl. X.R.

52—476

PO-1050
(5/69)

UNITED STATES PATENT OFFICE
CERTIFICATE OF CORRECTION

Patent No. 3,501,884          Dated March 24, 1970

Inventor(s) John J. DiCesare, Jr. and Edward J. Rutkowski

It is certified that error appears in the above-identified patent and that said Letters Patent are hereby corrected as shown below:

Column 2, line 40 "head" should read --bead--

Column 6, line 25 insert --to-- after 120

Column 10, line 51 "satd" should read --said--

SIGNED AND
SEALED
AUG 18 1970

(SEAL)
Attest:

Edward M. Fletcher, Jr.
Attesting Officer

WILLIAM E. SCHUYLER, JR.
Commissioner of Patents